Patented May 27, 1941

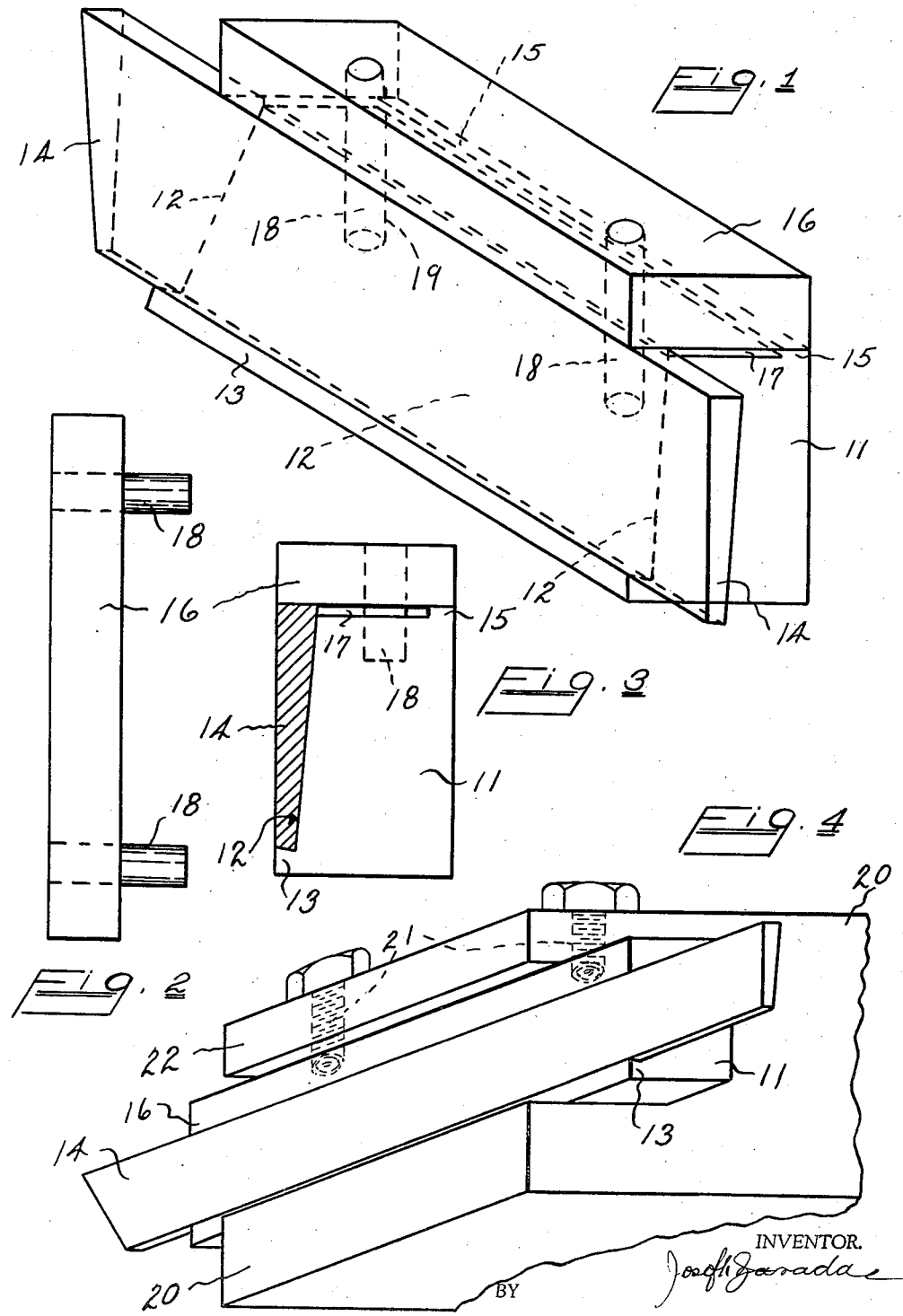

2,243,239

UNITED STATES PATENT OFFICE 2,243,239

TOOLHOLDER

Joseph Zasada, Detroit, Mich., assignor of one-half to Felix Skowron, Detroit, Mich.

Application May 24, 1939, Serial No. 275,389

6 Claims. (Cl. 29—96)

My invention relates to tool holders wherein the cutting tool receptacle provides suitable and adequate support for all lengths of cutting tools.

Heretofore when cutting tools are short due to frequent sharpening, difficulties are encountered in firmly holding the tool in place. Teetering, slipping and breakage often result from inadequate means of support for all the lengths of cutting tool with the consequent danger of accident.

It is the object hereof to replace present tool holders with a device which is more practicable because it is designed to receive and securely retain all lengths of cutting tools.

It is the further object to produce a tool holder which will hold and grip all widths of cutting blades.

It is the still further object to provide a tool holder with a minimum number of parts, manufacturable at a low cost, which accomplishes the objects herein set forth.

It is to be understood that the arrangement and combination of parts hereinafter shown and described is merely a preferable embodiment of my invention, and that said invention is intended to be limited only by the scope of the claims hereinafter set forth.

For a better understanding of my invention, reference should be had to the accompanying specification and claims in light of the appended drawing of which:

Figure 1 is a perspective view of the assembled tool holder with cutting tool disposed therein.

Figure 2 is a side elevation of the removable upper grip.

Figure 3 is an end elevation of the holder with tool in section.

Figure 4 is a perspective view of a tool holder operatively disposed within a suitable clamp of a milling machine, lathe, or the like.

Referring to the drawing, the shank or base portion 11 is cut away at 12 defining a lower tool grip 13. The side retaining support 12 is disposed in a plane at a small angle such as two degrees from a normal erected at the lower portion thereof. The lower supporting and gripping portion 13 is similarly cut inwardly and down at a larger angle such as twenty degrees below a normal erected at that point, providing cooperating surfaces for retaining and gripping the cutting tool 14. It is only necessary that the latter angle be large enough so that the blade will not come out while in use. It is to be noted that these angular supporting surfaces are designed to firmly secure said cutting tool which generally has surfaces of similar angular inclination for cooperation with the aforesaid parts 12 and 13 as shown in Figure 3 thereby providing a compact unit for gripping the cutting tool as will be shown as the description proceeds.

The elevated flange or ledge 15 forming an integral part of the shank 11, longitudinally disposed throughout the entire length thereof, provides supporting means for the upper grip 16 of the tool holder. Designed to cooperate with said ledge 15 and the entire upper extending edge of the cutting tool 14, is the removable upper block or tool grip 16. This block, preferably rectangular, is designed for longitudinal placement on the ledge 15 of said tool holder providing means for firmly and evenly retaining and gripping the cutting tool 14. It will be noted that the tool when supported upon the lower grip 13 extends above the recessed portion 17 a distance exactly equal to the elevation of the ledge or ridge 15.

In view of the fact that cutting tools of this type are of various heights, it is naturally contemplated that the elevations of the ledge 15 for different holders be such that the top edge of the tool lies in the same horizontal plane with the top edge of the flange 15.

The pins 18 fixedly disposed within the rectangular gripping block 16 in any suitable manner at right angles thereto are provided to cooperate with similarly disposed circular recesses 19 in the upper portion of the shank 11. These pins so operatively positioned maintain the proper relationship between the upper and lower tool grips preventing any relative motion thereof.

While in the preferable embodiment, pins 18 are secured to the upper block, it would be satisfactory for the pins to be secured to the upper portion of the shank 11. So arranged, the upper rectangular grip 16 would be provided with suitably positioned openings in the under surface thereof for cooperation therewith.

As shown in Figure 4, the tool holder support 20 may be of any desirable shape as long as it provides suitable retaining means for the shank 11 and lower grip 13, and means for exerting a downward pressure upon the upper grip 16.

The bolts 21 threadably journaled through the upper portion 22 of the clamp or tool holder support 20 provide vertical securing means for the upper grip 16 of said tool holder. Once properly inserted within the tool holder, as hereinbefore described, the cutting tool 14 is firmly gripped and held in place by means of the vertical pressure exerted through the upper grip 16 by the bolts 21.

It will be seen that the combination and arrangement of parts herein described provides a tool gripping device or holder which will prevent slipping, teetering or tipping of the tool no matter what its length may be. Vertical pressure exerted at various points upon the top of the upper grip 16 as by the aforesaid bolts 21 is distributed over the entire length of the ledge or flange 15 and similarly over the extending and abutting length of the cutting tool 14. Thus even though a cutting tool may be very short due to frequent sharpening, by means of the rectangular block or grip 16, the tool is firmly held in place with a uniform vertical pressure extending over the entire area of the exposed edge of said tool.

The cutting tool 14, it will be noted, longitudinally disposed on its edge along the gripping portion 13 of the shank 11 extends above the recessed portion 17 on the top of shank 11. Consequently an even support is provided to cooperate with the flange or ledge 15 to suitably support the upper grip 16.

It is contemplated that the tool holder herein described be adapted to various widths of cutting tool. Even though the tool 14 should extend beyond the edge of the lower grip 13, the upper grip as above described is capable of exerting sufficient uniform pressure as to hold such tool securely in place.

Having described my invention, reference should now be had to the claims which follow for determining the scope thereof.

I claim:

1. A tool holder comprised of an angularly recessed shank having an inclined lateral surface, a longitudinally disposed elevated grip support forming a part of said shank, being at the upper edge thereof furthest from said recess, a cutting tool longitudinally disposed on this recessed portion and resting against said inclined surface, the upper edge of said tool longitudinally extending parallel to said grip support, and at the same height, to define an intermediate recess, a rectangular grip evenly supported upon said tool and upon said elevated grip support, whereby pressure exerted upon the top of said grip is evenly distributed between the tool and grip support.

2. A tool holder comprised of an angularly recessed shank defining a tool support, a cutting tool longitudinally disposed thereon and extending above said shank, a longitudinally disposed elevated grip support integral with said shank at the upper edge thereof furthest from said recess, in parallel and spaced relation to the upper edge of the cutting tool, and a rectangular gripping member supported upon the upper edge of said tool and upon said grip support, whereby pressure exerted upon the top of said grip is evenly distributed between the tool and said grip support.

3. A tool holder comprised of a recessed shank defining a tool support, a cutting tool disposed thereon, elevated grip supporting means integral with said shank at the upper edge thereof furthest from said recess and in spaced relation to said tool, and a removable tool grip supportable upon said tool and upon said grip support, whereby pressure exerted upon said grip is evenly distributed to said tool and support to firmly retain said tool.

4. A tool holder comprised of a recessed shank defining a tool support, a cutting tool disposed thereon, an elevated grip supporting means on the upper surface of said shank remote from said recess providing a space between said means and said tool, a removable tool grip supportable upon said tool and upon said grip support, whereby pressure exerted upon said grip is evenly transferred to said tool and grip support, pins depending from said grip to co-operate with complementary openings in said shank, to prevent relative movement between said grip and support.

5. The combination with a tool holder support having means therein for exerting pressure; of a tool holder comprised of a recessed shank defining a tool support, a cutting tool disposed thereon, an elevated grip supporting means integral with said shank at the upper edge thereof furthest from said recess and in spaced relation to said tool, and a removable tool grip supportable upon said tool and grip support, whereby pressure exerted upon said grip is evenly distributed to said tool and to said grip support to firmly retain said tool.

6. A tool holder comprised of a recessed shank, an elevated grip support forming a part of said shank, being at the upper edge thereof furthest from said recess, a cutting tool disposed on this recessed portion, the upper edge of said tool extending parallel to said grip support and at the same height, to define an intermediate recess, a tool grip evenly supported upon the top edge of said tool and upon said elevated grip support, whereby pressure exerted upon the top of said grip is evenly distributed between the tool and grip support.

JOSEPH ZASADA.